(12) United States Patent
Eguchi et al.

(10) Patent No.: US 8,416,212 B2
(45) Date of Patent: Apr. 9, 2013

(54) ELECTRO-OPTICAL DEVICE AND ELECTRONIC APPARATUS

(75) Inventors: Tsukasa Eguchi, Matsumoto (JP); Eiji Kanda, Suwa (JP)

(73) Assignee: Sony Corporation, Tokyo (JP)

( * ) Notice: Subject to any disclaimer, the term of this patent is extended or adjusted under 35 U.S.C. 154(b) by 565 days.

(21) Appl. No.: 12/270,936

(22) Filed: Nov. 14, 2008

(65) Prior Publication Data

US 2009/0160822 A1 Jun. 25, 2009

(30) Foreign Application Priority Data

Dec. 21, 2007 (JP) ................................. 2007-329682

(51) Int. Cl.
*G06F 3/044* (2006.01)
(52) U.S. Cl. .................... 345/174; 345/104; 345/173
(58) Field of Classification Search .......... 345/173–177, 345/104
See application file for complete search history.

(56) References Cited

U.S. PATENT DOCUMENTS

| | | | | |
|---|---|---|---|---|
| 5,825,345 | A * | 10/1998 | Takahama et al. | 345/104 |
| 6,239,788 | B1 * | 5/2001 | Nohno et al. | 345/173 |
| 2006/0077186 | A1 * | 4/2006 | Park et al. | 345/173 |
| 2007/0030255 | A1 * | 2/2007 | Pak et al. | 345/173 |
| 2007/0091078 | A1 * | 4/2007 | Park et al. | 345/173 |

FOREIGN PATENT DOCUMENTS

| | | |
|---|---|---|
| JP | 10-333605 | 12/1998 |
| JP | 2001-042296 | 2/2001 |
| JP | 2001-075074 | 3/2001 |
| JP | 2006238053 A | 9/2006 |
| JP | 2007-041602 | 2/2007 |
| JP | 2007-048275 | 2/2007 |
| JP | 2007048275 A | 2/2007 |

OTHER PUBLICATIONS

Japanese Office Action issued Mar. 13, 2012, for corresponding Japanese Appln. No. 2007-329682.
Notice of reasons for refusal issued in connection with Japanese Patent Application No. 2007-329682, dated Nov. 20, 2012. (2 pages).

* cited by examiner

*Primary Examiner* — Joseph Feild
*Assistant Examiner* — Andrew Sasinowski
(74) *Attorney, Agent, or Firm* — K&L Gates LLP (57) ABSTRACT

An electro-optical device, which has a display area and a plurality of sensing areas for detecting capacitance in the display area, includes a black matrix that is provided in the vicinities of display pixels in the display area, pixel electrodes that individually form the display pixels, a common electrode, a liquid crystal layer that is interposed between the pixel electrodes and the common electrode, a plurality of pixel circuits that individually drive the pixel electrodes, a capacitance detection element that is provided in a corresponding one of the sensing areas to convert a change in thickness of the liquid crystal layer caused by external pressure into a change in capacitance, and a sensing circuit that outputs a sensing signal on the basis of the change in capacitance obtained by the capacitance detection element. The capacitance detection element overlaps the black matrix in planar view.

11 Claims, 10 Drawing Sheets

FIG. 5
<Tres: RESET PERIOD>

ELECTRO-OPTICAL DEVICE AND ELECTRONIC APPARATUS

RELATED APPLICATIONS

The present application is based on, and claims priority from, Japanese Application Number 2007-329682, filed Dec. 21, 2007, the disclosure of which is hereby incorporated by reference herein in its entirety.

BACKGROUND

1. Technical Field

The present invention relates to an electro-optical device and an electronic apparatus.

2. Related Art

In general, a touch panel is provided on a topside of a display device such that a user can select information displayed on a screen of the display device by using his/her finger or an object. The touch panel detects a touch position at which the user touches the touch panel using his/her finger or the object, and receives information regarding the touch position on the display device as an input signal. The touch panel is then driven on the basis of the input signal. Display devices with touch panels are being increasingly used since an additional input device, such as a keyboard or a mouse, which is connected to the display device, is not needed.

An apparatus has been developed in which a liquid crystal panel has a touch panel function. For example, a photo-detection touch panel is known in which a TFT (Thin Film Transistor) substrate has a touch panel function (for example, see JP-A-2006-238053). In addition, a liquid crystal display is known in which a change in liquid crystal capacitance when being touched is read for touch sensing (for example, JP-A-2007-48275).

When a touch sensor (touch panel) is provided on a liquid crystal panel, the panel increases in thickness. According to the technology disclosed in JP-A-2006-238053, if a sensing area, which is a non-display area, is provided below a black matrix (BM), photo-detection sensitivity is lowered. If the sensing area is provided outside the BM, contrast is lowered. That is, it is difficult to satisfactorily perform both display and sensing.

According to the technology disclosed in JP-A-2007-48275, a sensing area is disposed near display pixels. Since a sensing signal is generated by reading a change in capacitance, each electrode preferably has a large area. However, the larger the area of each electrode is, the lower the aperture ratio of a display area is. Furthermore, if the sensing area has a high resolution, the aperture ratio is low.

SUMMARY

The invention may be embodied as the following aspects.

According to an aspect of the invention, there is provided an electro-optical device that has a display area and a plurality of sensing areas for detecting capacitance in the display area. The electro-optical device includes a black matrix that is provided in the vicinities of display pixels in the display area, pixel electrodes that individually form the display pixels, a common electrode, a liquid crystal layer that is interposed between the pixel electrodes and the common electrode, a plurality of pixel circuits that individually drive the pixel electrodes, a capacitance detection element that is provided in a corresponding one of the sensing areas to convert a change in thickness of the liquid crystal layer caused by external pressure into a change in capacitance, and a sensing circuit that outputs a sensing signal on the basis of the change in capacitance obtained by the capacitance detection element. The capacitance detection element overlaps the black matrix in planar view.

With this configuration, the capacitance detection element of the sensing circuit, which is a non-display area, overlaps the black matrix in planar view. For this reason, the aperture ratio of a display area increases, and thus display performance is improved. In addition, if the capacitance detection element is provided in a wide range, sensing performance is improved. Therefore, it is possible to provide an electro-optical device that is capable of increasing sensing performance, without lowering display performance for image display.

The electro-optical device according to the aspect of the invention may further include a driving circuit that, on the basis of the sensing signal, generates positional information about a position at which the external pressure is being applied.

With this configuration, in the electro-optical device, it is possible to generate positional information about a position at which pressure is being applied. Therefore, it is possible to provide an electro-optical device that is capable of efficiently specifying positional information.

In the electro-optical device according to the aspect of the invention, the sensing circuit may overlap the black matrix in planar view.

With this configuration, it is possible to suppress an influence of light leakage from each transistor by external light, and also to improve display visibility.

In the electro-optical device according to the aspect of the invention, an interval between one terminal and the other terminal of the capacitance detection element may be smaller than an interval between the pixel electrodes and the common electrode.

With this configuration, a capacitive component of the capacitance detection element increases. Therefore, it is possible to improve sensing performance without lowering display quality.

In the electro-optical device according to the aspect of the invention, at least two of a plurality of capacitance detection elements may be electrically connected in parallel.

With this configuration, it is possible to increase an opposing area of first and second electrodes of the capacitance detection element, and thus to increase a capacitive component. Therefore, it is possible to improve sensing performance without lowering display quality.

According to another aspect of the invention, an electronic apparatus includes the above-described electro-optical device.

With this configuration, since the electro-optical device is mounted, it is possible to provide an electronic apparatus that is capable of increasing sensing performance, without lowering display performance for image display.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments of the invention will be described with reference to the drawings. In the following drawings, the scale of each member has been adjusted so as to be recognizable. In this specification, a minimum unit for image display is referred to as a "subpixel", and a collection of a plurality of subpixels having color filters for respective colors is referred to as a "pixel".

First Embodiment

Figure 1:
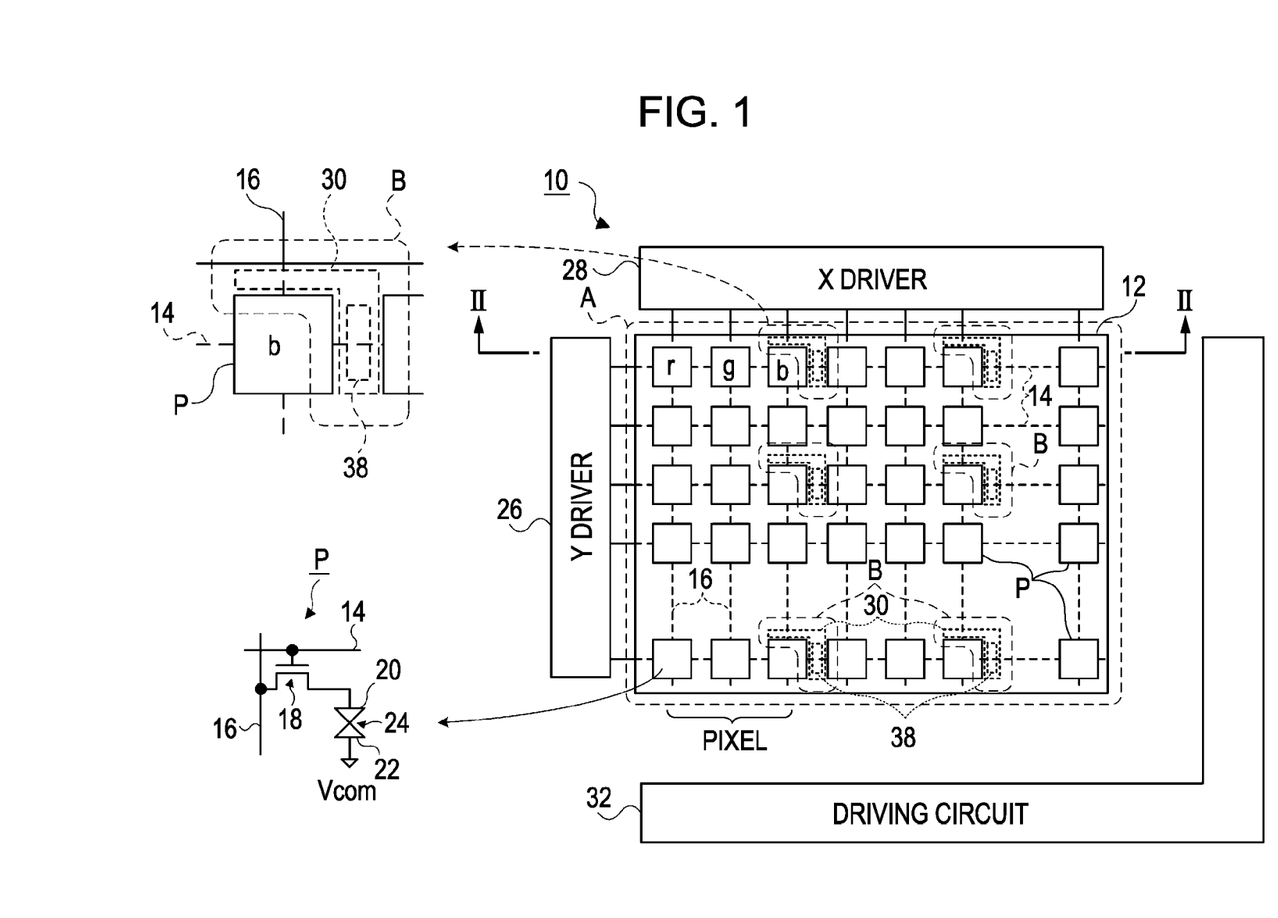
FIG. 1 is a block diagram showing the configuration of a liquid crystal display as an electro-optical device according to a first embodiment of the invention.

FIG. 1 is a block diagram showing the configuration of a liquid crystal display as an electro-optical device according to this embodiment. A liquid crystal display 10 has a display area A, and a plurality of sensing areas B that are provided in the display area A. The sensing areas B overlap a black matrix (BM) 12 that is a non-display area where no image is displayed. Provided in the display area A are a plurality of scanning lines 14, a plurality of data lines 16, and a plurality of pixel circuits P that are planarly provided at intersections of the scanning lines 14 and data lines 16 with the BM 12 in the vicinity thereof. Each of the pixel circuits P includes a transistor 18, a pixel electrode 20, a common electrode 22, to which a common potential Vcom is applied, and a liquid crystal layer 24 that is interposed between the pixel electrode 20 and the common electrode 22. The transistor 18 is formed of a TFT (Thin Film Transistor) element. A gate of the transistor 18 is connected to a corresponding one of the scanning lines 14, a drain of the transistor 18 is connected to a corresponding one of the data lines 16, and a source of the transistor 18 is connected to the pixel electrode 20. The BM 12 is provided in the vicinity of each pixel (display pixel) in the display area A. The pixel is formed by the pixel electrode 20, the common electrode 22, and the liquid crystal layer 24.

A Y driver 26 generates scanning signals for sequentially selecting the plurality of scanning lines 14, and supplies the scanning signals to the pixel circuits P. A scanning signal is a pulse having a width corresponding to one horizontal scanning period (1H) from the start of one vertical scanning period (1F), and is supplied to a scanning line 14 of a first row. The pulses are sequentially shifted and supplied to the scanning lines 14 as the scanning signals. An X driver 28 supplies a data signal having a voltage according to a gray-scale level to be displayed in each of the pixel circuits P corresponding to the selected scanning line 14.

A sensing circuit 30 is provided in each sensing area B. The sensing circuit 30 outputs a sensing signal on the basis of a change in thickness of the liquid crystal layer 24 caused by external pressure. A driving circuit 32 generates positional information about a position, at which external pressure is being applied, on the basis of the sensing signal.

Figure 2:
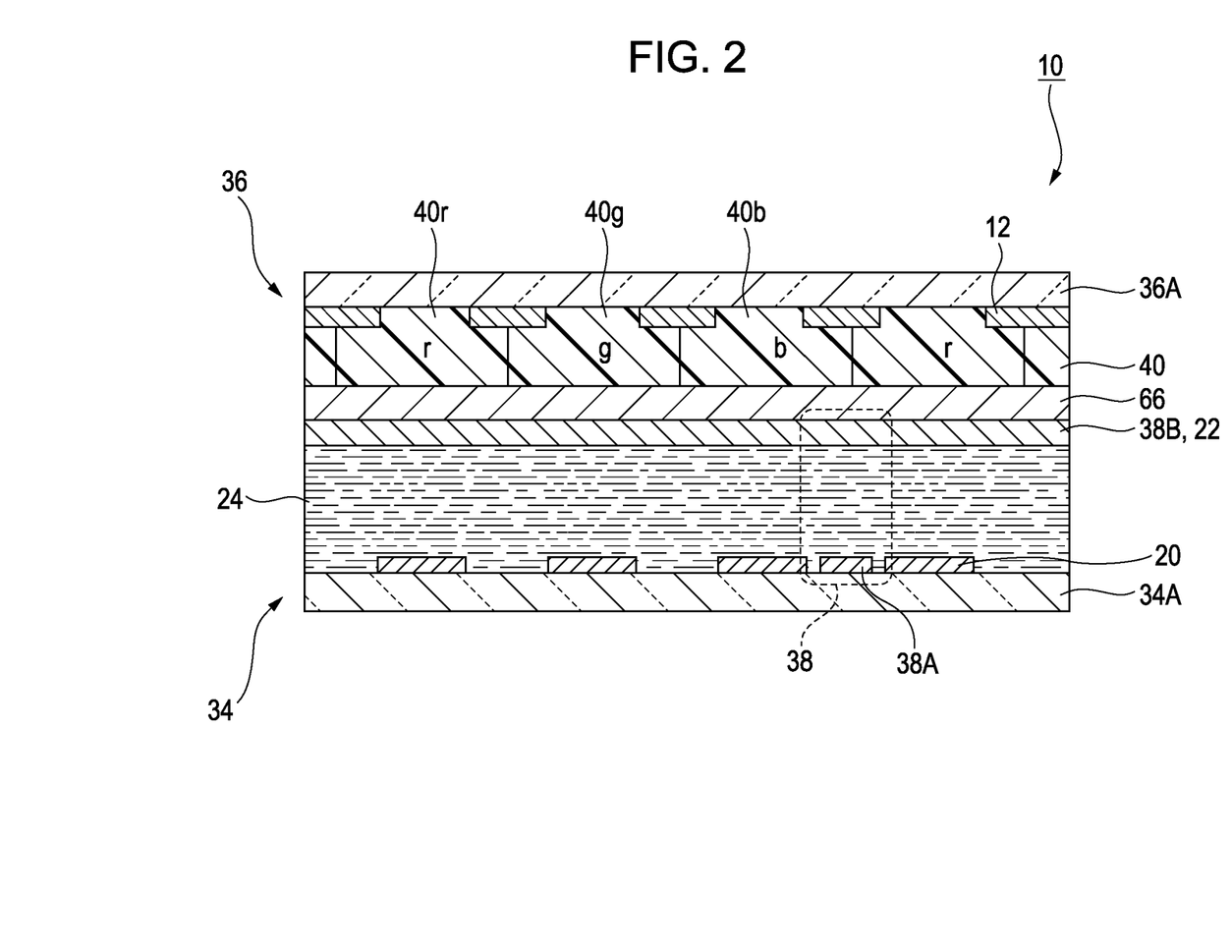
FIG. 2 is a schematic sectional view showing the structure of a liquid crystal display according to the first embodiment, which includes a capacitance detection element.

FIG. 2 is a schematic sectional view showing the structure of a liquid crystal display according to this embodiment, which includes a capacitance detection element 38. (A subpixel portion corresponds to a sectional view taken along the line II-II of FIG. 1). The liquid crystal display 10 has an element substrate 34 and a counter substrate 36 serving as a pair of transparent substrates, which oppose each other with a predetermined gap therebetween. Liquid crystal serving as an electro-optical material is injected between the substrates, thereby forming a liquid crystal layer 24. The gap between the element substrate 34 and the counter substrate 36 is maintained by spacers (not shown).

The element substrate 34 has a substrate body 34A made of a translucent material, such as glass, quartz, or plastic as a base. Inside the substrate body 34A (a side facing the liquid crystal layer 24), the transistor 18 (see FIG. 1), the sensing circuit 30 (excluding a second electrode 38B) (see FIG. 1), the pixel electrode 20, and an alignment film (not shown) are formed. The pixel electrode 20 is made of a light-transmissive conductive material, such as ITO (Indium Tin Oxide).

The counter substrate 36 has a substrate body 36A made of a translucent material, such as glass, quartz, or plastic, as a base. Inside the substrate body 36A (a side facing the liquid crystal layer 24), color filters 40 made of color materials of colors corresponding to the subpixel areas, the common electrode 22, a planarization layer 66, and an alignment film (not shown) are laminated. The common electrode 22 is provided so as to at least partially overlap the BM 12. The common electrode 22 is made of a light-transmissive conductive material, such as ITO, and spreads evenly in a plane to cover a plurality of subpixel areas.

The liquid crystal display 10 has a plurality of pixels arranged in a matrix. Each pixel has three subpixels corresponding to color filters 40r (red), 40g (green), and 40b (blue) of three colors.

The color filters 40r, 40g, and 40b may be formed by, for example, coating a photosensitive resin material including a color material for each color on the substrate body 36A and performing exposure and development by photolithography. As the coating method, spin coating, slit coating, or the like may be used.

The capacitance detection element 38 has the liquid crystal layer 24, a second electrode 38B, serving as the other terminal, which is formed simultaneously with the common electrode 22, and a first electrode 38A, serving as one terminal, which is formed simultaneously with the pixel electrode 20, and opposes the second electrode 38B with the liquid crystal layer 24 interposed therebetween to form a sensing capacitor. A sensing signal is output from the sensing circuit 30 (see FIG. 1) in accordance with a change in capacitance of the sensing capacitor caused by external pressure. The capacitance detection element 38 is provided between the pixel electrodes 20 on the element substrate 34, and overlaps the BM 12. Specifically, the first electrode 38A is provided between the pixel electrodes 20 on the element substrate 34, and overlaps the BM 12. The capacitance detection element 38 and the sensing circuit 30 may overlap the BM 12. Therefore, it is possible to suppress an influence of light leakage from each transistor by external light (described below), and also to improve display visibility.

Next, the sensing circuit 30 will be described with reference to FIG. 3.

Figure 3:
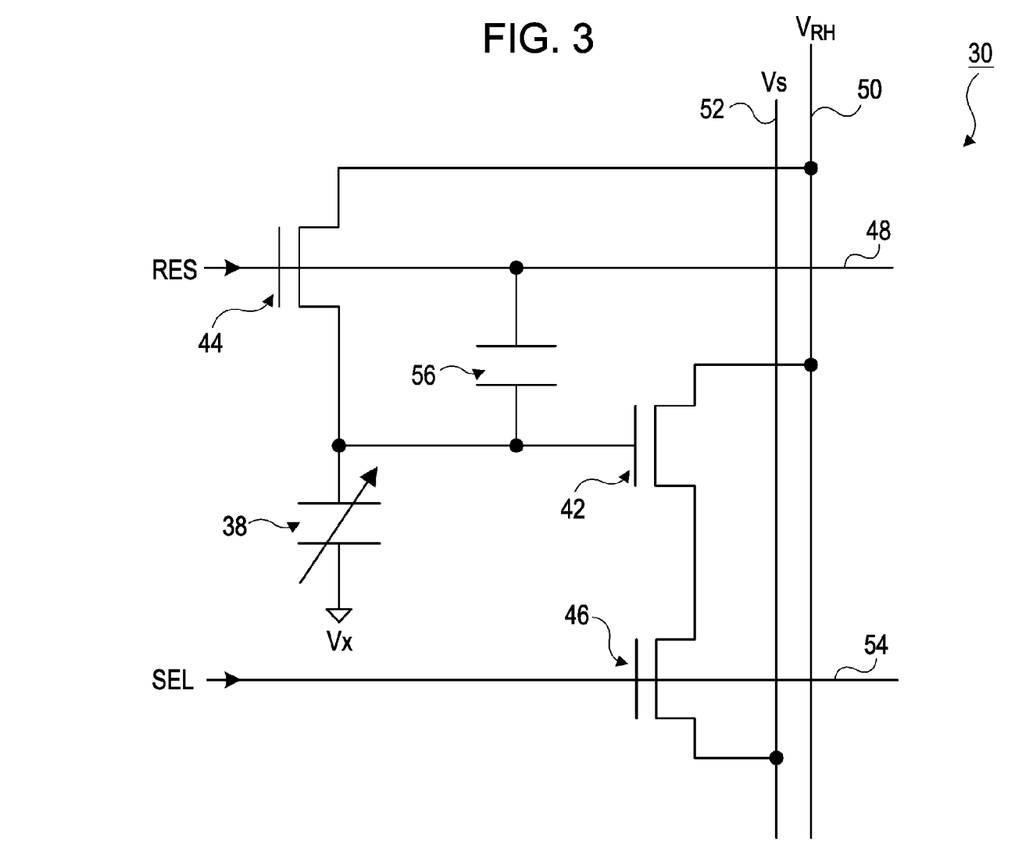
FIG. 3 is a circuit diagram of a sensing circuit according to the first embodiment.

FIG. 3 is a circuit diagram of the sensing circuit 30 according to this embodiment. As shown in FIG. 3, the sensing circuit 30 has an amplification transistor 42, a rest transistor 44, and a selection transistor 46. These transistors are formed of TFT elements, like the transistor 18 of the pixel circuit P, and are formed by the same process.

A reset signal RES is supplied to a gate of the reset transistor 44 through a first control line 48. A drain of the reset transistor 44 is connected to a power line 50, and a source of the reset transistor 44 is connected to a gate of the amplification transistor 42. A voltage $V_{RH}$ is supplied to the power line 50. A drain of the amplification transistor 42 is connected to the power line 50, and a source of the amplification transistor 42 is connected to a drain of the selection transistor 46. A source of the selection transistor 46 is connected to a detection line 52. A selection signal SEL is supplied to a gate of the selection transistor 46 through a second control line 54.

A reference capacitive element 56 is provided between the gate of the amplification transistor 42 and the first control line 48. One terminal of the capacitance detection element 38 is connected to the gate of the amplification transistor 42. A fixed potential Vx is supplied to the other terminal of the capacitance detection element 38. In this example, the fixed potential Vx is different from the common potential Vcom.

Therefore, even though the common potential Vcom is changed due to AC driving, there is no case where the potential of the amplification transistor 42 is changed, and it is possible to perform sensing independently from image display. In addition, it is not necessary to perform sensing in synchronization with the cycle of image display of the display device. Therefore, it is possible to perform sensing as occasion arises or to perform sensing at a longer cycle. As a result, power consumption can be reduced.

Next, the operation of the sensing circuit 30 will be described with reference to FIGS. 4 to 7.

Figure 4:
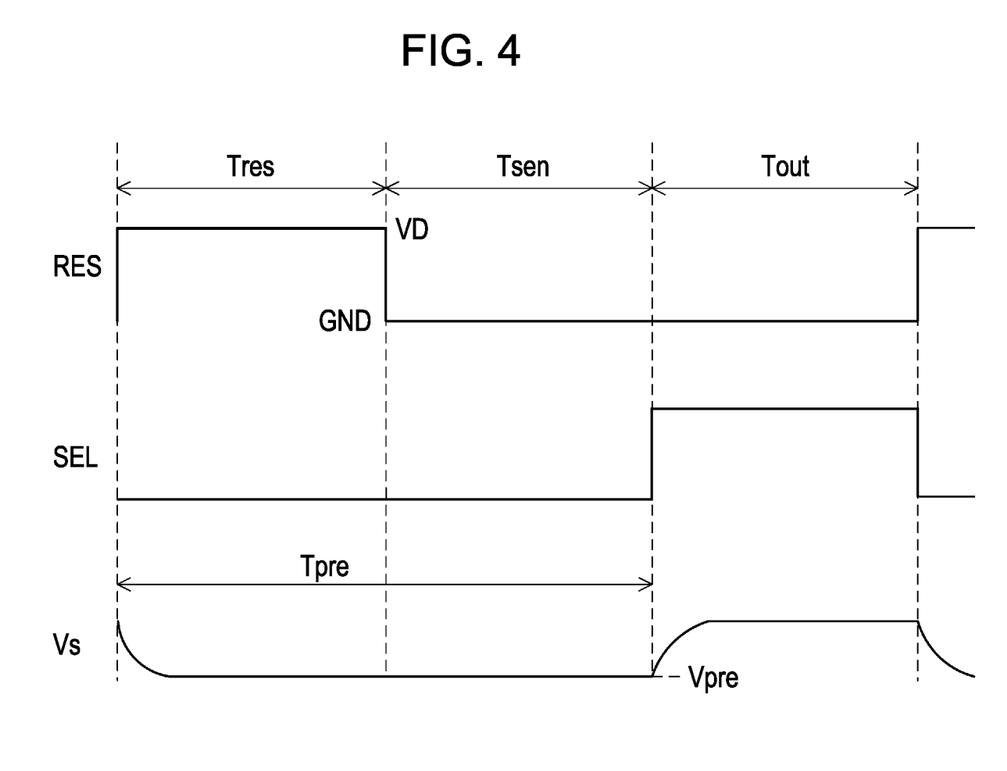
FIG. 4 is a timing chart illustrating the operation of a sensing circuit according to the first embodiment.
Figure 5:
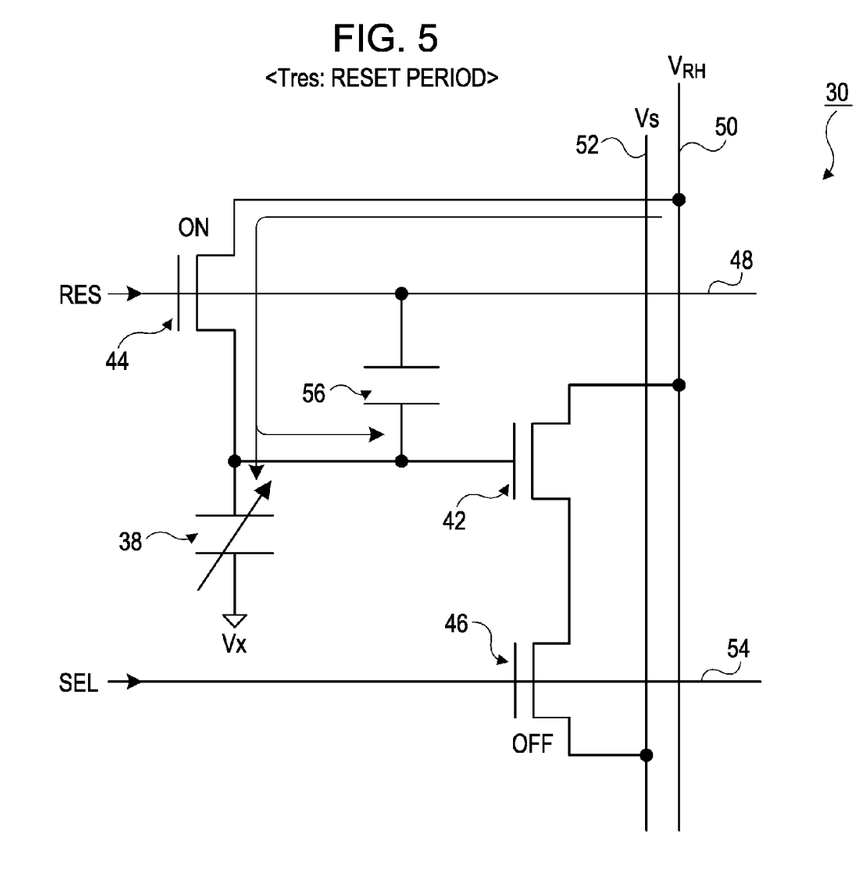
FIG. 5 is a circuit diagram of a sensing circuit according to the first embodiment.
Figure 6:
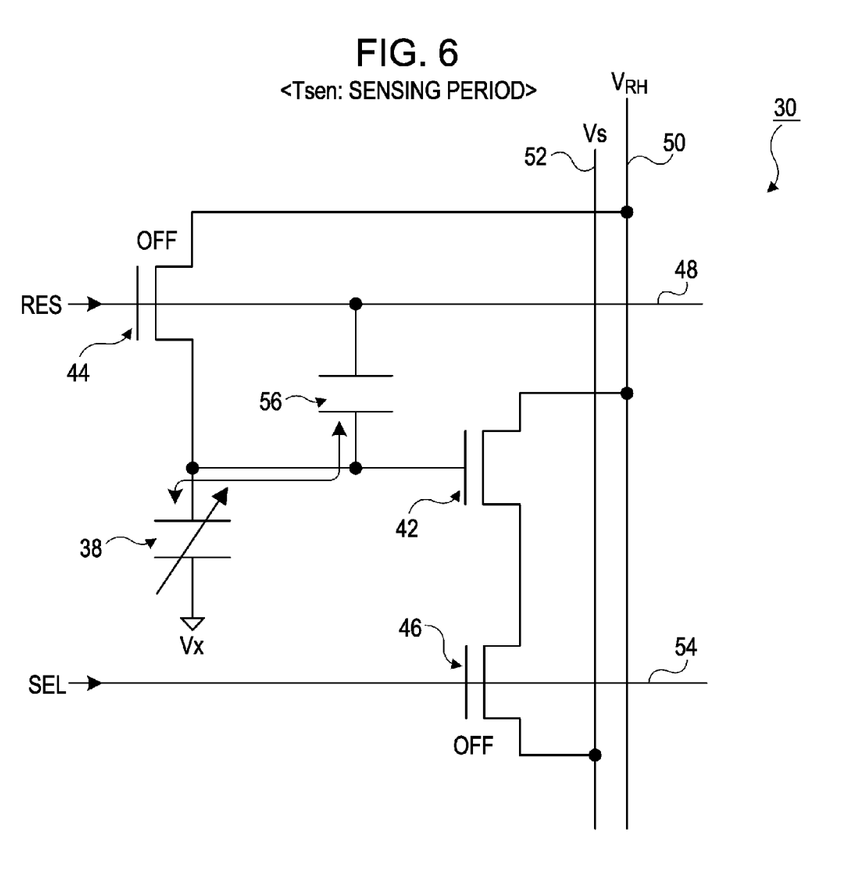
FIG. 6 is a circuit diagram of a sensing circuit according to the first embodiment.
Figure 7:
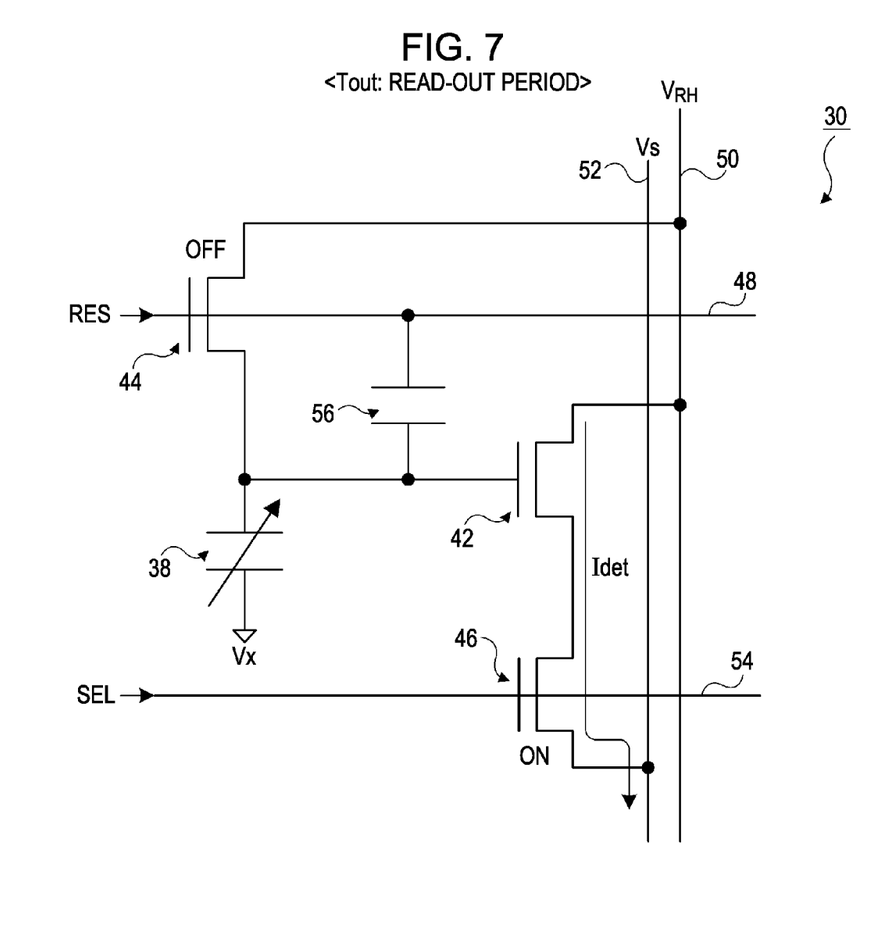
FIG. 7 is a circuit diagram of a sensing circuit according to the first embodiment.

FIG. 4 is a timing chart illustrating the operation of the sensing circuit 30 according to this embodiment. FIGS. 5 to 7 are circuit diagrams of the sensing circuit 30 according to this embodiment. As shown in FIG. 4, the sensing circuit 30 operates for each of a reset period Tres, a sensing period Tsen, and a read-out period Tout as a unit. First, during the reset period Tres, the reset signal RES is at VD, and the reset transistor 44 is turned on. In this case, the selection signal SEL is at a low level, and the selection transistor 46 is turned off. Therefore, as shown in FIG. 5, the gate of the amplification transistor 42 is reset to a power supply potential $V_{RH}$.

Next, during the sensing period Tsen subsequent to the reset period Tres, the reset signal RES is changed from VD to GND (=0 V). Then, as shown in FIG. 6, the reset transistor 44 is turned off. Since the first control line 48 is connected to one terminal of the reference capacitive element 56, the reference capacitive element 56 functions as a coupling capacitor. Therefore, if the level of the reset signal RES is changed, the gate potential of the amplification transistor 42 is changed.

If the capacitance of the reference capacitive element 56 is Cr, the capacitance of the capacitance detection element 38 is Cs, and a change in potential of the first control line 48 is ΔVgate (=VD), the change ΔV in the gate potential of the amplification transistor 42 is expressed by Equation (1). Parasitic capacitance is neglected.

$$\Delta V = \Delta V\text{gate} * Cr/(Cr+Cs) \quad (1)$$

From Equation (1), if the capacitance Cs of the capacitance detection element 38 is large, the change ΔV caused by capacitance coupling is small. To the contrary, if the capacitance Cs is small, the change ΔV is large. Therefore, the change in capacitance of the capacitance detection element 38 can be reflected in the gate potential.

Next, during the read-out period Tout, the selection signal SEL is changed from the low level to a high level. Then, as shown in FIG. 7, the selection transistor 46 is turned off. Therefore, a detection current Idet corresponding to the gate potential of the amplification transistor 42 flows in the detection line 52.

Meanwhile, in order to ensure that the selection transistor 46 is reliably turned on during the read-out period Tout, it is preferable to precharge the potential of the detection line 52 to a precharge potential Vpre before the read-out period Tout. In this example, as shown in FIG. 4, during the reset period Tres and the sensing period Tsen, that is, a precharge period Tpre, the precharge potential Vpre is supplied to the detection line 52.

Figure 8A:
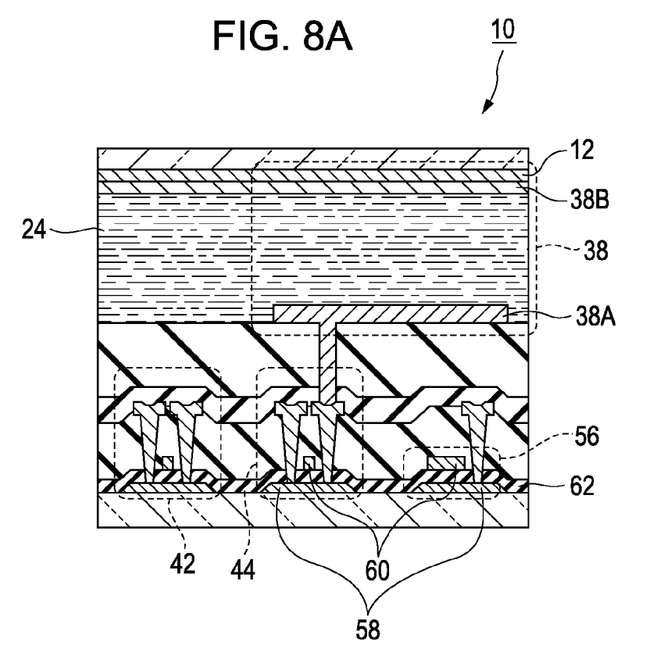
FIGS. 8A and 8B are diagrams showing a change in capacitance by a capacitance detection element according to the first embodiment.
Figure 8B:
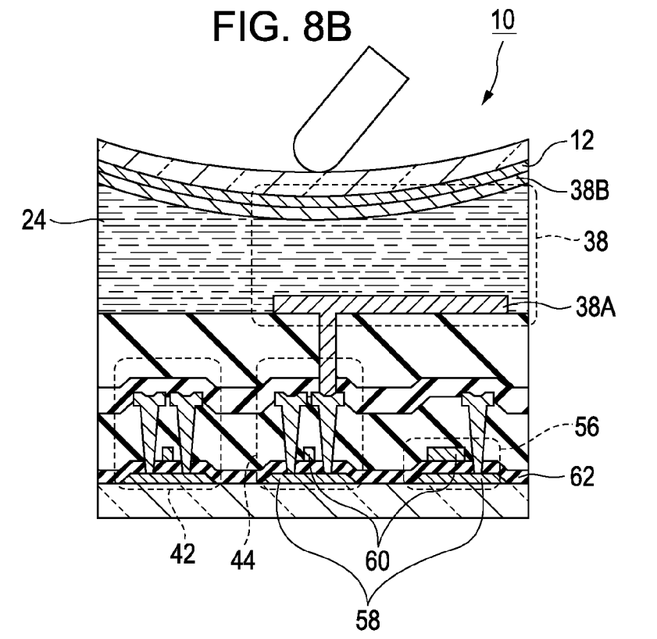

A change in capacitance of the capacitance detection element 38 will be described with reference to FIGS. 8A and 8B. FIGS. 8A and 8B are diagrams showing a change in capacitance of the capacitance detection element 38 according to this embodiment. The capacitance detection element 38 has, as shown in FIGS. 8A and 8B, the first electrode 38A and the second electrode 38B with the liquid crystal 34 interposed therebetween. In a state where a user's finger does not touch the liquid crystal display 10, as shown in FIG. 8A, the first electrode 38A and the second electrode 38B are parallel to each other. Meanwhile, if the user presses the liquid crystal display 10 using his/her finger, as shown in FIG. 8B, the second electrode 38B is bent, and the distance between the first electrode 38A and the second electrode 38B is reduced. For this reason, if the user presses the liquid crystal display 10 using his/her finger, the capacitance Cs of the capacitance detection element 38 increases. In this way, a change in capacitance is detected.

In this example, the reference capacitive element 56 uses a semiconductor layer 58 and a gate wiring line 60 as one electrode and another electrode, respectively. A gate oxide film 62 is interposed between the semiconductor layer 58 and the gate wiring line 60. The semiconductor layer 58, the gate wiring line 60, and the gate oxide film 62 are formed by the same process as other transistors 42 and 44. Therefore, an additional process for forming the reference capacitive element 56 is not needed, and as a result manufacturing costs can be reduced.

Second Embodiment

A second embodiment will be described with reference to the drawings.

Figure 9:
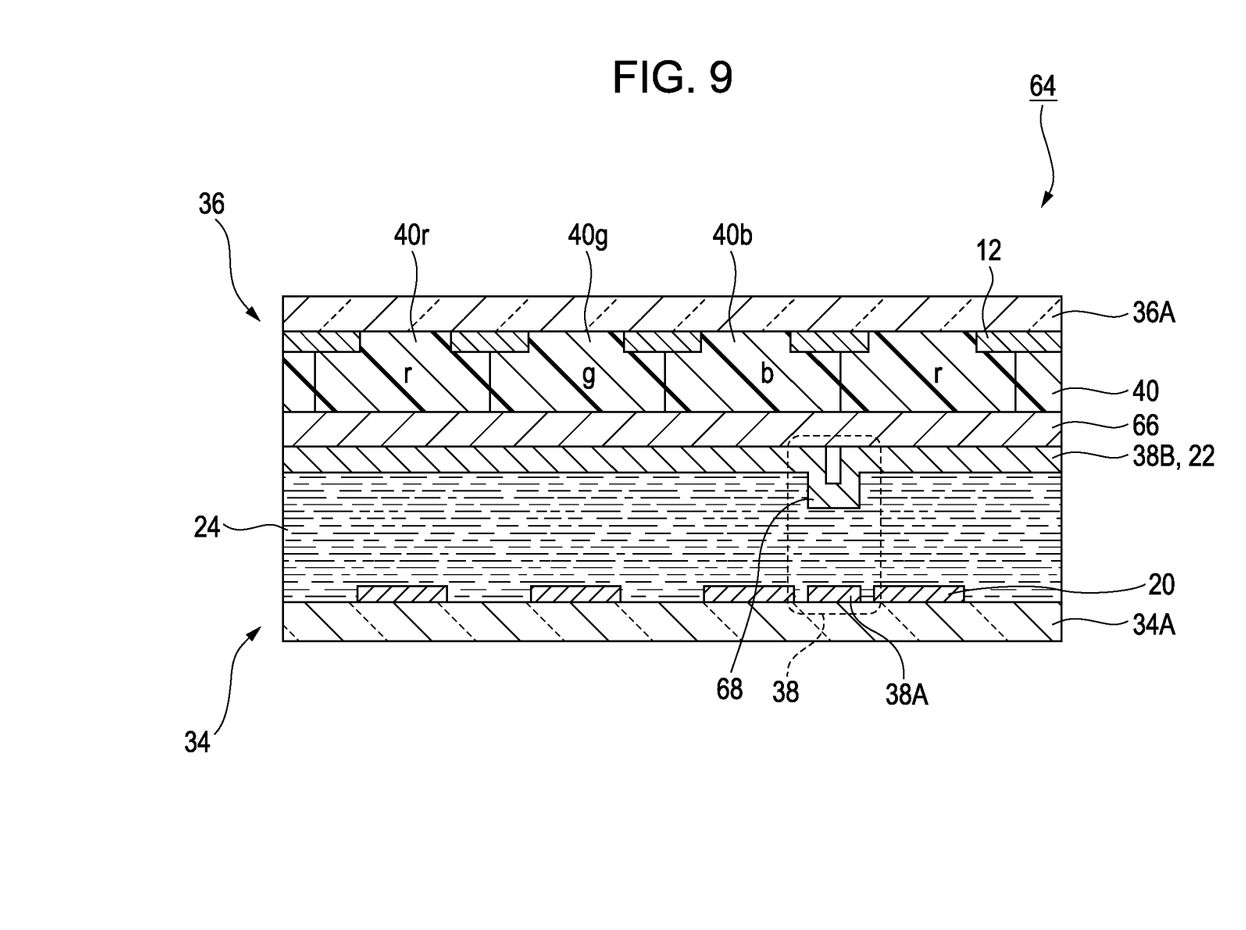
FIG. 9 is a schematic sectional view showing the structure of a liquid crystal display according to a second embodiment of the invention, which includes a capacitance detection element.

FIG. 9 is a schematic sectional view showing the structure of a liquid crystal display according to this embodiment, which includes a capacitance detection element 38. Similarly to the liquid crystal display 10 of the first embodiment, a liquid crystal display 64 of this embodiment is a TFT active driving transmissive liquid crystal display. The liquid crystal display 64 is characterized by a gap between the first electrode 38A and the second electrode 38B. The liquid crystal display of this embodiment has the same basic configuration as that of the liquid crystal display of the first embodiment. Therefore, the same parts are represented by the same reference numerals, and thus description thereof will be omitted.

As shown in FIG. 9, in the liquid crystal display 64 of this embodiment, a protrusion 68 is provided at a portion of the second electrode 38B opposing the first electrode 38A (a portion overlapping the BM 12), such that a gap between the first electrode 38A and the second electrode 38B is smaller than a gap between the pixel electrode 20 and the common electrode 22. With this configuration, a capacitive component of the capacitance detection element 38 increases. Therefore, it is possible to improve sensing performance without lowering display quality.

Third Embodiment

Next, a third embodiment will be described with reference to the drawings. As shown in FIG. 1, in a liquid crystal display 10 of this embodiment, at least two of a plurality of capacitance detection elements 38 are electrically connected in parallel. With this configuration, an overlap area of the opposing electrodes of the capacitance detection element 38 increases, and a capacitive component increases. Therefore, it is possible to improve sensing performance without lowering display quality.

Electronic Apparatus

Next, an electronic apparatus using a liquid crystal display according to the foregoing embodiment will be described with reference to FIGS. 10A to 10C.

Figure 10A:
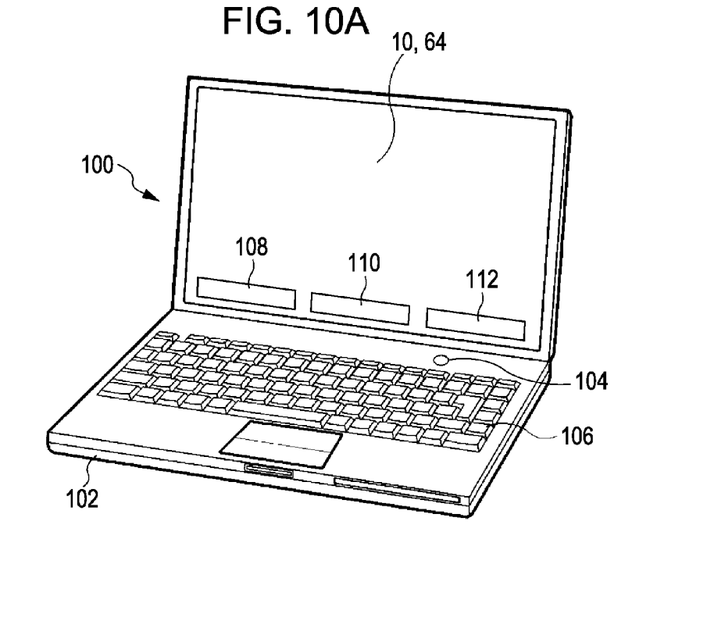
FIGS. 10A to 10C are perspective view showing examples of an electronic apparatus according to an embodiment of the invention.

FIG. 10A is a perspective view showing the configuration of a mobile personal computer 100, which uses the liquid crystal display 10 (64) of the foregoing embodiment as a display unit. The personal computer 100 has the liquid crystal display 10 (64) as a display unit, and a main body 102. In the main body 102, a power switch 104 and a keyboard 106 are provided. Menu buttons 108, 110, 112 are displayed on the liquid crystal display 10 (64). These menu buttons may be individually assigned to various programs. For example, an electronic mail may be assigned to the menu button 108, a browser may be assigned to the menu button 110, and drawing software may be assigned to the menu button 112. The user may operate the keyboard 106 to run desired software without touching the menu button.

Figure 10B:
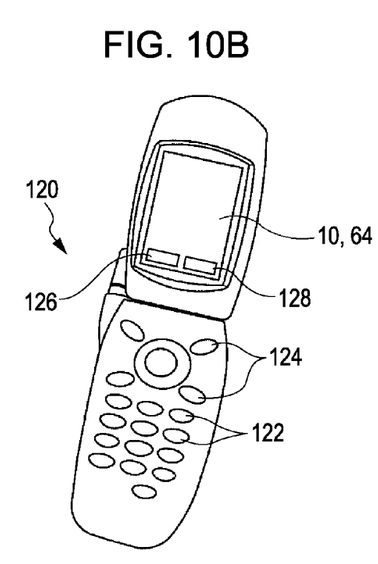

FIG. 10B is a perspective view showing the configuration of a mobile phone 120, to which the liquid crystal display 10 (64) of the foregoing embodiment is applied. The mobile phone 120 has a plurality of operating buttons 122, a scroll button 124, and the liquid crystal display 10 (64) as a display unit. A user operates the scroll button 124 to scroll a screen displayed on the liquid crystal display 10 (64). Menu buttons 126 and 128 are displayed on the liquid crystal display 10 (64). For example, if the user touches the menu button 126, a directory is displayed, and if the user touches the menu button 128, the telephone number of that mobile phone is displayed.

Figure 10C:
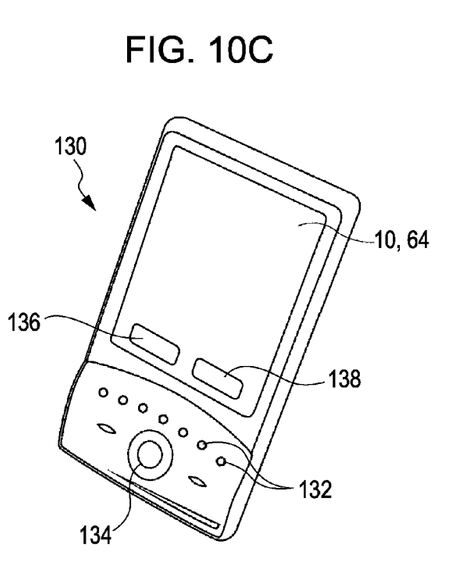

FIG. 10C is a perspective view showing the configuration of a personal digital assistant (PDA) 130, to which the liquid crystal display 10 (64) of the foregoing embodiment is applied. The PDA 130 has a plurality of operating buttons 132, a power switch 134, and the liquid crystal display 10 (64) as a display unit. If a user operates the power switch 134, menu buttons 136 and 138 are displayed. For example, if the user presses the menu button 136, an address book is displayed, and if the user presses the menu button 138, a scheduler is displayed.

As the electronic apparatus, to which the electro-optical device of the foregoing embodiment is applied, in addition to those shown in FIGS. 10A to 10C, a digital still camera, a television, a video camera, a car navigation device, an electronic organizer, an electronic paper, an electronic calculator, a word processor, a workstation, a video phone, a scanner, a copy machine, a video player, and an apparatus having a touch panel may be exemplified.

Although the sensing circuit 30 is formed in the same plane as the pixel circuit P of the display area A, it may be formed on and bonded to the display area A as a separate substrate. In this case, the first control line 48 may be used as a wiring line for supplying a potential to one electrode of the reference capacitive element 56, and a wiring line for supplying the reset signal RES to the gate of the reset transistor 44. Therefore, it is also possible to achieve the reduction in the number of wiring lines.

Although in the foregoing embodiments, an example where the electro-optical device is applied to the liquid crystal display has been described, the invention may be applied to an organic EL display.

What is claimed is:

1. An electro-optical device that has a display area and a sensing area for detecting capacitance in the display area, the electro-optical device comprising:
   a plurality of display pixels each including a plurality of sub-pixels in the display area;
   a black matrix that is provided in the vicinity of the sub-pixels;
   a pixel electrode, a common electrode and a liquid crystal layer that form the display pixel, the liquid crystal layer being interposed between the pixel electrode and the common electrode;
   a pixel circuit that drives the pixel electrode;
   a capacitance detection element that is provided between the display pixels in the sensing area such that a distance between adjacent sub-pixels is substantially equal throughout the display area; and
   a sensing circuit that outputs a sensing signal on the basis of the change in capacitance obtained by the capacitance detection element,
   wherein the capacitance detection element overlaps the black matrix in planar view, and
   wherein a distance between sub-pixels in a same display pixel is greater than a distance between the capacitance detection element and an adjacent sub-pixel.

2. The electro-optical device according to claim 1, further comprising:
   a driving circuit that, on the basis of the sensing signal, generates positional information about a position at which the external pressure is being applied.

3. The electro-optical device according to claim 1,
   wherein the sensing circuit overlaps the black matrix in planar view.

4. The electro-optical device according to claim 1, further comprising;
   another capacitance detection element electrically connected in parallel with the capacitance element.

5. An electronic apparatus comprising the electro-optical device according to claim 1.

6. The electro-optical device according to claim 1, wherein the capacitance detection element includes a protrusion provided at a portion of the second electrode opposing the first electrode.

7. The electro-optical device according to claim 1, wherein the capacitance detection element is between a first two sub-pixels in the same row and not between a second two sub-pixels in the same row, wherein a distance between the first two sub-pixels is substantially equal to a distance between the second two sub-pixels.

8. The electro-optical device according to claim 7,
   wherein each of the sub-pixels includes a TFT, and the TFT is separate from the capacitance detection element between the second two sub-pixels.

9. The electro-optical device according to claim 1, wherein a distance between a first electrode and a second electrode of the capacitance detection element is smaller than a distance between the pixel electrode and the common electrode.

10. The electro-optical device according to claim 1, wherein
- a fixed voltage is supplied to the capacitance detection element, and
- a common voltage, separate from the fixed voltage, is provided to the pixel circuit.

11. The electro-optical device according to claim 10, wherein
- the capacitance detection element is configured to perform sensing independently from image display.

* * * * *